(12) United States Patent
Nagashima et al.

(10) Patent No.: US 7,160,032 B2
(45) Date of Patent: Jan. 9, 2007

(54) ELECTRO-OPTICAL COMPOSITE CONNECTOR, ELECTRO-OPTICAL COMPOSITE CABLE, AND NETWORK DEVICES USING THE SAME

(75) Inventors: Zenya Nagashima, Kanagawa (JP); Hiroki Kanehira, Miyagi (JP); Yoshiaki Watanabe, Kanagawa (JP)

(73) Assignee: Sony Corporation (JP)

( * ) Notice: Subject to any disclaimer, the term of this patent is extended or adjusted under 35 U.S.C. 154(b) by 212 days.

(21) Appl. No.: 10/823,694

(22) Filed: Apr. 14, 2004

(65) Prior Publication Data

US 2004/0218873 A1   Nov. 4, 2004

(30) Foreign Application Priority Data

Apr. 24, 2003 (JP) ............... P2003-120173

(51) Int. Cl.
*G02B 6/38* (2006.01)
*G02B 6/36* (2006.01)

(52) U.S. Cl. ............... 385/75; 385/88; 385/101
(58) Field of Classification Search ............... 385/75, 385/88, 101
See application file for complete search history.

(56) References Cited

U.S. PATENT DOCUMENTS

| | | | | |
|---|---|---|---|---|
| 3,878,397 | A * | 4/1975 | Robb et al. ............... | 250/551 |
| 4,281,253 | A | 7/1981 | Culver ............... | 250/551 |
| 4,303,301 | A | 12/1981 | Teichert et al. ............... | 385/75 |
| 4,595,839 | A * | 6/1986 | Braun et al. ............... | 250/551 |
| 4,925,267 | A | 5/1990 | Plummer et al. ............... | 385/74 |
| 5,327,230 | A | 7/1994 | Dockery ............... | 725/79 |
| 5,598,495 | A * | 1/1997 | Rittle et al. ............... | 385/75 |
| 5,696,861 | A * | 12/1997 | Schimmeyer et al. ............... | 385/75 |
| 5,963,349 | A | 10/1999 | Norte ............... | 398/42 |
| 6,078,712 | A | 6/2000 | Tschope et al. ............... | 385/101 |
| 6,299,362 | B1 * | 10/2001 | Gilliland et al. ............... | 385/92 |
| 6,533,466 | B1 * | 3/2003 | Smith ............... | 385/75 |
| 6,880,982 | B1 * | 4/2005 | Imamura ............... | 385/88 |
| 6,903,934 | B1 * | 6/2005 | Lo et al. ............... | 361/728 |
| 2003/0123813 | A1 * | 7/2003 | Ravasio et al. ............... | 385/88 |
| 2003/0235379 | A1 * | 12/2003 | Lin ............... | 385/101 |

FOREIGN PATENT DOCUMENTS

| | | |
|---|---|---|
| EP | 0 113 024 A | 7/1984 |
| EP | 0 256 892 A2 | 2/1988 |
| EP | 0 896 234 A2 | 2/1999 |
| GB | 2 112 544 A | 7/1983 |

OTHER PUBLICATIONS

EPO Search Report dated Aug. 2, 2004.
EPO Search Report dated Sep. 23, 2004.

* cited by examiner

*Primary Examiner*—Sung Pak
*Assistant Examiner*—Daniel Petkovsek
(74) *Attorney, Agent, or Firm*—Ronald P. Kananen; Rader Fishman & Grauer PLLC

(57) ABSTRACT

The electro-optical composite connector comprises an electro-optical composite plug and an electro-optical receptacle. The electro-optical composite plug or electro-optical composite receptacle converts an optical signal from an optical fiber to an electric signal and transmits to the opposing electro-optical receptacle or electro-optical composite plug through a power connecting metal or power connecting metal receiver. The opposing electro-optical composite receptacle or electro-optical composite plug converts the electric signal to the optical signal and transmits to the optical fiber.

12 Claims, 5 Drawing Sheets

ELECTRO-OPTICAL COMPOSITE CONNECTOR, ELECTRO-OPTICAL COMPOSITE CABLE, AND NETWORK DEVICES USING THE SAME

BACKGROUND OF THE INVENTION

1. Field of the Invention

The present invention relates to a device incorporating power line and information line or the like for transmitting information between information communication devices. Particularly, it relates to an electro-optical composite connector, an electro-optical composite cable and network device using the same.

2. Description of Related Art

Conventionally, a device incorporating power line and information line or the like for transmitting information between information communication devices has been developed. The device has complicated arrangement of wiring between the communication devices. Up to now, radio communication, electric line wiring, electro-optical composite cable and the like have been proposed to solve the problem about complexity between the information communication devices.

However, the radio communication has a problem in the aspect of information security because of its low directivity. Additionally, it has a problem such that communication velocity changes depending on atmospheric condition.

The electric line wiring comes to communicate with a noise source because metallic information wire and power line are gathered, thereby prevent it from being made widely available presently.

Thus, the electro-optical composite cable employing optical fiber as information line has been proposed and resolution of the above-described problem about complexity and an increase in velocity of information transmission have been intended.

For example, as shown in FIG. 1, an electro-optical composite cable 3 having a ferrule 1a for connecting an optical fiber on a plug side and a ferrule 2a for connecting an optical fiber 3a on an outlet side has been proposed.

In this case, the electro-optical composite cable 3 incorporating an electric wire 3b and an optical fiber 3a has the ferrule 1a to which the optical fiber 3a is connected and a power connecting metal 1b on a plug 1 on one side thereof, i.e., on the plug side. It also has the ferrule 2a to which the optical fiber 3a is connected and a power connecting metal receiver 2b on a connector 2 on the other side thereof, i.e., on the outlet side.

As shown in FIG. 2, an electro-optical composite connector having a ferrule 4 for connecting an optical fiber 6 on a plug side and a ferrule 5 for connecting the optical fiber 6 on the receptacle side has been proposed.

In this case, the electro-optical composite plug 7 is formed into housing molded of synthetic resin having substantially the same configuration as a power plug. A cable connecting mouth for mounting the electro-optical composite cable 8 is provided in one end face of the housing. A terminal of an optical fiber 6a is mounted in a narrow hole in the axis of a tapered ferrule 4 made of insulator. A terminal of an insulated power line 9 is mounted to a conductive power connecting metal 10 with a screw. The ferrule 4 is mounted on the convex section on the end face on an opposite side to the cable connecting mouth of the plug 7. A ferrule-fixing tongue 11 made of synthetic resin is provided around the ferrule 4.

The electro-optical composite receptacle 12 comprises a receiver 13 for receiving the conductive power connecting metal 10 of the electro-optical composite plug 7. The receiver 13 opposing the power connecting metal 10 is provided with an insulated power line 9 connecting with an electro-optical composite cable 8. The receptacle 12 also comprises the ferrule 5, which opposes the tapered ferrule 4 of the electro-optical composite plug 7. The ferrule 5 is disposed on a concave section positioned in a center of the end face of the electro-optical composite receptacle 12. An insulating tongue-piece-fixing section for nipping the ferrule-fixing tongue 11 of the electro-optical composite plug 7 is provided around this ferrule 5.

Connecting the electro-optical composite plug 7 and the electro-optical composite receptacle 12 under this configuration enables the receiver 13 to receive the power connecting metal 10 and the ferrules 4, 5 to be connect with other. This allows the power lines 9, 9 and the optical fibers 6a, 6b to be connected with each other accurately.

In the electro-optical composite cable and the electro-optical composite connector as described above, however, one ferrule is directly inserted into the other ferrule to transmit information. This causes a problem such that deterioration of signals may occur if dust or dirt adheres to the optical fiber when the ferrules are inserted or removed.

Additionally, using the optical fiber includes possibility of deterioration due to flaw and a problem about the safety due to usage of laser.

Accordingly, an object of the present invention is to provide an electro-optical composite connector and the like, which are capable of suppressing deterioration of signals due to adhering of dust or dirt on a ferrule-connecting end face and which enable user to use them without any special care.

SUMMARY OF THE INVENTION

To achieve the above object, according to an aspect of the present invention, there is provided an electro-optical composite connector for connecting first and second cables. The first cable incorporates a first power line and a first optical fiber, and the second cable incorporates a second power line and a second optical fiber. The connector comprises an electro-optical composite plug having a power connecting device that connects the first power line to supply power, and a first signal converter for converting an optical signal transmitted through the first optical fiber to an electric signal flowing into the second power line and for converting an electric signal transmitted through the second power line to an optical signal flowing into the first optical fiber. The connector also comprises an electro-optical composite receptacle having a receiver for receiving and releasing the power connecting device, and a second signal converter for converting an optical signal transmitted through the second optical fiber to an electric signal flowing into the first power line and for converting an electric signal transmitted through the first power line to an optical signal flowing into the second optical fiber.

The first and second signal converters are electrically connected to the first and second power lines. When the electro-optical composite plug and the electro-optical composite receptacle are detachably attached to each other, the electric signal output from any one of the first and second signal converter is transmitted through the power connecting device and the receiver.

Preferably, a pair of male terminals made of conductive material is provided on the electro-optical composite plug while a pair of female terminals made of conductive material is provided on the electro-optical composite receptacle. The first and second signal converters are electrically connected to the male terminal or the female terminal. When the electro-optical composite plug and the electro-optical composite receptacle are detachably connected to each other, the electric signal output from any one of the first and second signal converters is transmitted through the male and female terminals.

According to another aspect of the present invention, there is provided an electro-optical composite connector for connecting first and second cables. The connector comprises an electro-optical composite plug having a power connecting device that connects the first power line to supply power, and a first signal converter for converting an optical signal transmitted through the first optical fiber to an optical signal transmitted through space and for converting an optical signal transmitted through space to an optical signal transmitted through the first optical fiber. The connector also comprises an electro-optical composite receptacle having a receiver for receiving and releasing the power connecting device, and a second signal converter for converting an optical signal transmitted through the second optical fiber to an optical signal transmitted through space and for converting an optical signal transmitted through space to an optical signal transmitted through the second optical fiber.

According to still another aspect of the present invention, there is provided an electro-optical composite cable. The cable comprises a cable body incorporating a power line and an optical fiber. The cable also comprises an electro-optical composite plug, which is connected to an end of the cable body and has a power connecting device that connects the power line to supply power and a first signal converter for converting an optical signal transmitted through the optical fiber to an electric signal flowing into the power line and for converting an electric signal transmitted through the power line to an optical signal flowing into the optical fiber. The cable further comprises an electro-optical composite receptacle, which is connected to the other end of the cable body and has a receiver for receiving and releasing a power connecting device and a second power converter for converting an optical signal transmitted through the optical fiber to an electric signal flowing into the power line and for converting an electric signal transmitted through the power line to an optical signal flowing into the optical fiber.

Preferably, the first and second signal converters are electrically connected to the power line. When the electro-optical composite plug and a electro-optical composite receptacle of the other cable or the electro-optical composite receptacle and an electro-optical composite plug of the other cable are detachably attached to each other, the electric signal output from any one of the first and second signal converters is transmitted through the power connecting device and the receiver.

Preferably, a pair of male terminals made of conductive material is provided on the electro-optical composite plug while a pair of female terminals made of conductive material is provided on the electro-optical composite receptacle. The first and second signal converters are electrically connected to the male terminal and the female terminal, respectively. When the electro-optical composite plug and a electro-optical composite receptacle of the other cable or the electro-optical composite receptacle and an electro-optical composite plug of the other cable are detachably attached to each other, the electric signal output from any one of the first and second signal converters is transmitted through the male terminal and the female terminal.

According to a further aspect of the present invention, there is provided an electro-optical composite cable comprising a cable body incorporating a power line and an optical fiber. The cable comprises an electro-optical composite plug, which is connected to an end of the cable body and has a power connecting device that connects the power line to supply power, and a first signal converter for converting an optical signal transmitted through the optical fiber to an optical signal transmitted through space and for converting an optical signal transmitted through space to an optical signal transmitted through the optical fiber. The cable also comprises an electro-optical composite receptacle, which is connected to the other end of the cable body and has a receiver for receiving and releasing a power connecting device of another cable, and a second signal converter for converting an optical signal transmitted through the optical fiber to an optical signal transmitted through space and for converting an optical signal transmitted through space to an optical signal transmitted through the optical fiber.

According to a still further aspect of the present invention, there is provided a network device for allowing electro-optical composite cable incorporating a power line and an optical fiber to be connected thereto. The network device comprises an electro-optical composite plug or an electro-optical composite receptacle. The plug has a power connecting device that connects the power line to supply power and a first signal converter for converting an optical signal transmitted through the optical fiber to an electric signal flowing into the power line and for converting an electric signal transmitted through the power line to an optical signal flowing into the optical fiber. The receptacle has a receiver for receiving and releasing the power connecting device and a second signal converter for converting an optical signal transmitted through the optical fiber to an electric signal flowing into the power line and for converting an electric signal transmitted through the power line to an optical signal flowing into the optical fiber.

Preferably, the first or second signal converter is electrically connected to the power line. When the electro-optical composite plug contained in the network device and an electro-optical composite receptacle of the cable are detachably attached to each other or the electro-optical composite plug of the cable and an electro-optical composite receptacle contained in the network device are detachably attached to each other, the electric signal output from any one of the first and second signal converters is transmitted through the power connecting device and the receiver.

Preferably, a pair of male terminals made of conductive material is provided on the electro-optical composite plug while a pair of female terminals made of conductive material is provided on the electro-optical composite receptacle. The first signal converter is electrically connected to the male terminal. The second signal converter is electrically connected to the female terminal. When the electro-optical composite plug contained in the network device and an electro-optical composite receptacle of the cable are detachably attached to each other or the electro-optical composite plug of the cable and an electro-optical composite receptacle contained in the network device are detachably attached to each other, the electric signal output from the first or second signal converter is transmitted through the male terminal and the female terminal.

According to a yet still further aspect of the present invention, there is provided a network device for allowing electro-optical composite cable incorporating a power line and an optical fiber to be connected thereto. The network device comprises an electro-optical composite plug or an electro-optical composite receptacle. The plug has a power connecting device that connects the power line to supply power and a first signal converter for converting an optical signal transmitted through the optical fiber to an optical signal transmitted through space and for converting an optical signal transmitted through space to an optical signal flowing into the optical fiber. The receptacle has a receiver for receiving and releasing the power connecting device and a second signal converter for converting an optical signal transmitted through space to an optical signal transmitted through the optical fiber and for converting an optical signal transmitted through the optical fiber to an optical signal transmitted through space.

Thus, according to the present invention, each of the electro-optical composite plug and the electro-optical composite receptacle are provided with a signal converter for converting the optical signal transmitted through the optical fiber to the electric signal flowing into the power line or the electric signal to the optical signal, the optical signal transmitted through the optical fiber is converted to the electric signal by the electro-optical composite plug or the electro-optical composite receptacle, and the electric signal thus converted is transmitted to an opposing side through the power connecting device and the receiver (or special connecting terminals). This allows deterioration of a signal due to adhering of dust on a ferrule-connecting end face, which is usually seen conventionally, to be suppressed. Accordingly, no special care is needed for handling of the optical fiber, thereby enabling an ordinary user to use the connector and the like easily.

Further, a problem about the safety relating to usage of laser can be solved.

According to the present invention, by providing the electro-optical composite plug and the electro-optical composite receptacle with a signal converter for converting the optical signal transmitted through the optical fiber to the optical signal transmitted through space or the optical signal transmitted through space to the optical signal transmitted through the optical fiber, the optical signal transmitted through the optical fiber is converted to the optical signal transmitted through space by the electro-optical composite plug or the electro-optical composite receptacle and transmitted to an opposing side through the optical system. Consequently, the optical fiber is not exposed to outside. This also allows deterioration of a signal due to adhering of dust on a ferrule-connecting end face, which is usually seen conventionally, to be suppressed and no special care is needed for handling of the optical fiber, thereby enabling an ordinary user to use the connector and the like easily.

Because of no exposed section of the optical fiber, deterioration of a signal due to flaw therein can be prevented.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing (s) wherein like reference characters refer to like elements.

DESCRIPTION OF THE PREFERRED EMBODIMENTS

Figure 1:
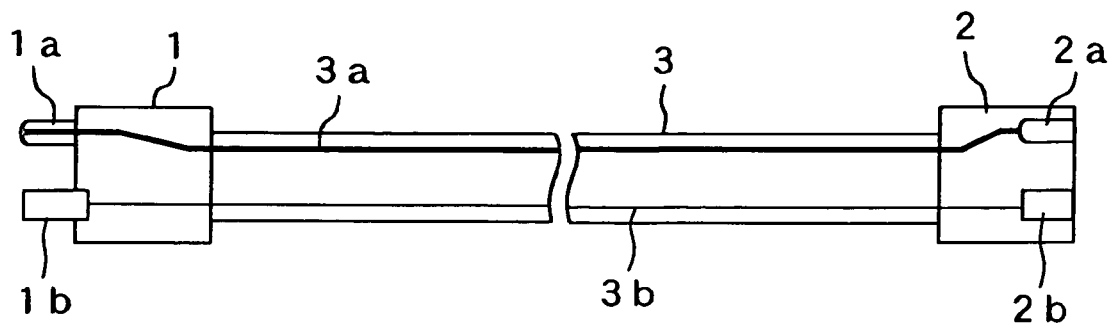
FIG. 1 is a diagram for showing a configuration of a conventional electro-optical composite cable.
Figure 2:
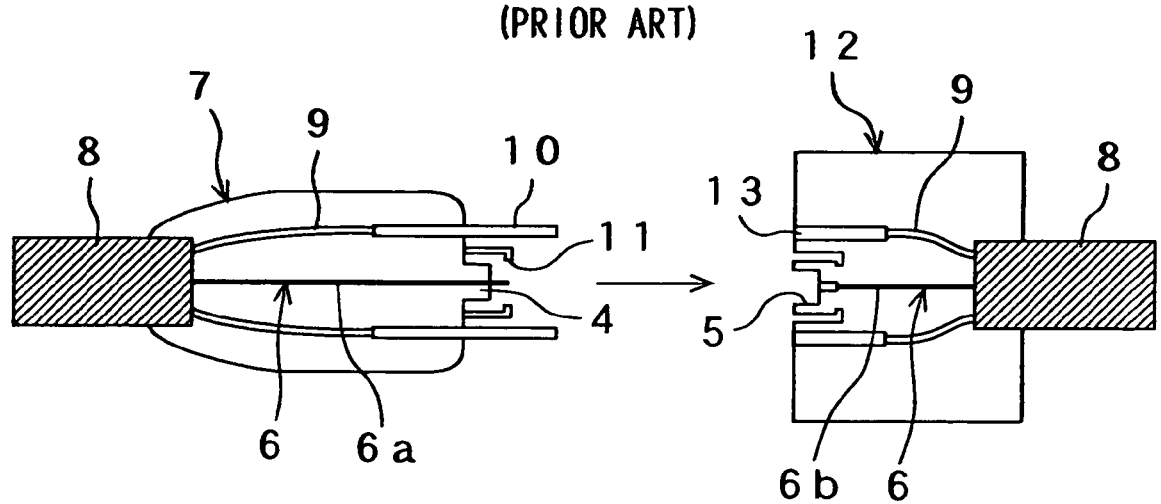
FIG. 2 is a diagram for showing a configuration of a conventional electro-optical composite connector.
Figure 3:
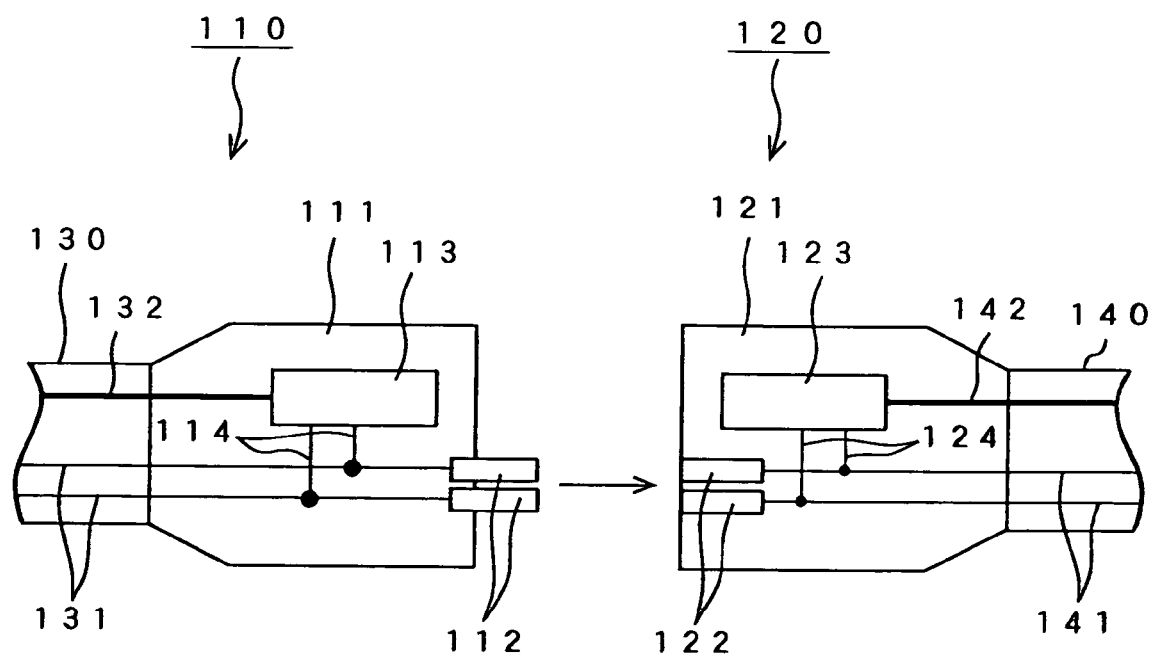
FIG. 3 is a diagram for showing a configuration of an electro-optical composite connector according to a first embodiment of the invention.

Hereinafter, a first embodiment of the present invention will be described with reference to the accompanying drawings. FIG. 3 shows a configuration of an electro-optical composite connector 100 according to the first embodiment of the invention.

As shown in FIG. 3, the electro-optical composite connector 100 comprises an electro-optical composite plug 110 and an electro-optical composite receptacle 120. In the state shown in FIG. 3, a cable 130 is connected to the electro-optical composite plug 110 and a cable 140 is connected to the electro-optical composite receptacle 120. The cable 130 incorporates a power line 131 and an optical fiber 132. The cable 140 also incorporates a power line 141 and an optical fiber 142.

The electro-optical composite plug 110 comprises a housing 111, a power connecting metal 112, a transceiver 113 which is used as signal converting means, and a lead wire 114.

The housing 111 is formed in substantially the same configuration as that of the housing of a conventional power plug. A power connecting metal 112 is disposed at a front end section of this housing 111 and the cable 130 is disposed at the rear section thereof. The transceiver 113 is provided inside the housing 111.

In this embodiment, the power connecting metal 112 is formed of a pair of terminals made of conductive metal, which may be inserted into an outlet. An end of the power connecting metal 112 projects out of the housing 113. The other end of the power connecting metal 112 is fixed within the housing 113 and connected to the power line 131 of the cable 130.

The transceiver 113 converts an optical signal transmitted through the optical fiber 132 to an electric signal or converts an electric signal, which has been gained by conversion from an optical signal, to an optical signal. This transceiver 113 is sealed into the housing 111 and connected to the optical fiber 132 of the cable 130. The transceiver 113 is also connected to the power line 131 through the lead wire 114. An electric signal output from the transceiver 113 is transmitted to the opposing electro-optical composite receptacle 120 through the power line 131 and the power connecting metal 112. Further, an electric signal from the opposing electro-optical composite receptacle 120 is input to the transceiver 113 through the power connecting metal 112 and the power line 131.

Figure 4:
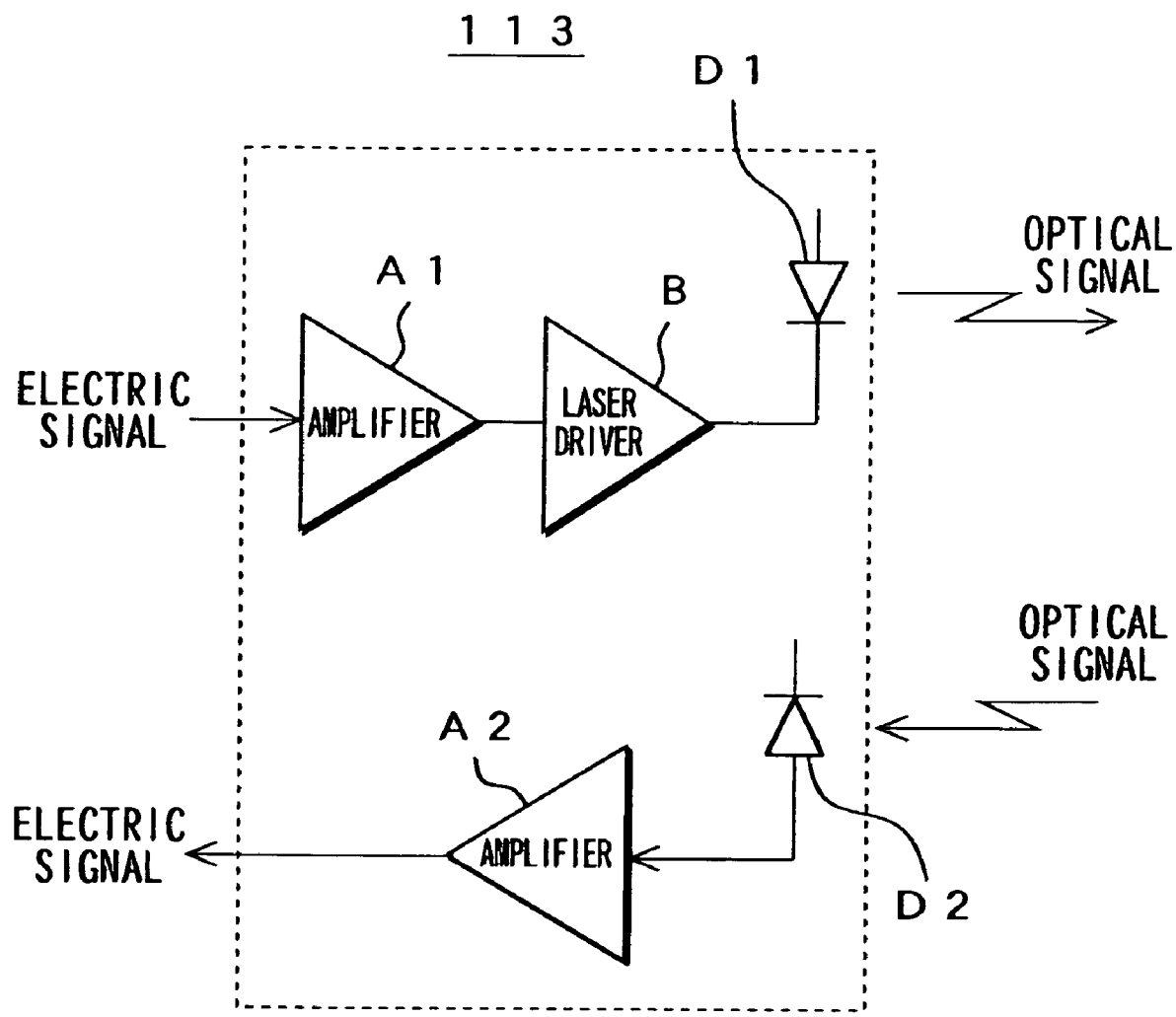
FIG. 4 is a diagram for showing a configuration of a transceiver.

FIG. 4 shows a configuration of the transceiver 113. As shown in FIG. 4, the transceiver 113 comprises amplifiers A1, A2, a laser driver B, a laser diode D1 and a photo diode D2.

The amplifier A1 adjusts an input electric signal in level. The laser driver B receives a pulse signal (voltage signal) from the amplifier A1 to convert it to a current signal and supply the converted signal to the laser diode D1. The laser diode D1 is driven by a current signal generated by the laser driver B and emits beam according to a pattern corresponding to an input signal so as to generate an optical signal. The optical signal generated from the laser diode D1 is transmitted through the optical fiber 132.

The photo diode D2 receives optical signal transmitted through the optical fiber 132 and outputs it as a current signal. The amplifier A2 converts the current signal received from the photo diode D2 to a voltage signal and outputs it.

With such the configuration, an optical signal from the optical fiber 132 can be converted to an electric signal and further an electric signal from the electro-optical composite receptacle 120 can be converted to an optical signal.

The electro-optical composite receptacle 120 shown in FIG. 3 comprises a housing 121, a receiver 122 for receiving the power connecting metal 112, a transceiver 123 acting as signal converting means, and a lead wire 124.

The housing 121 is formed in substantially the same configuration as that of the housing of a conventional power plug. A power connecting metal receiver 122 is disposed at a front end section of this housing 121 and a cable 140 is disposed at the rear section thereof. A transceiver 123 is provided within the housing 21.

In this embodiment, the power connecting metal receiver 122 is constituted of a pair of conductive metal, which acts as terminals for the outlet and on which the power connecting metal 112 can be attached detachably. This receiver 122 is fixed within the housing 121 and connected to the power line 141 in the cable 140.

The transceiver 123 converts an optical signal transmitted through the optical fiber 142 to an electric signal and converts an electric signal, which has been gained from conversion of the optical signal, to an optical signal. The transceiver 123 has the same configuration as that of the transceiver 113. This transceiver 123 is sealed within the housing 121 and connected to the optical fiber 142 of the cable 140. The transceiver 123 is connected to the power line 141 through the lead line 124. An electric signal output from the transceiver 123 is transmitted to the opposing electro-optical composite plug 110 through the lead wire 124, the power line 141, and the receiver 122. An electric signal from the opposing electro-optical composite plug 110 is input to the transceiver 123 through the power connecting metal receiver 122, the power line 141, and the lead wire 124.

With such the configuration, the optical signals from the optical fibers 132, 142 are converted to the electric signal in the electro-optical composite plug 110 or the electro-optical composite receptacle 120. The converted electric signal is transmitted to the opposing electro-optical composite receptacle 120 or electro-optical composite plug 110. The opposing electro-optical composite receptacle 120 or electro-optical composite plug 110 converts this electric signal to the optical signal and transmits it to its mating side.

The operations of the electro-optical composite connector 100 will be described with reference to FIGS. 3 and 4.

For example, the optical signal transmitted through the optical fiber 132 of the cable 130 is input to the transceiver 113. In the transceiver 113, this input optical signal is impinged upon the photo diode D2. The photo diode D2 converts the impinged optical signal to an electric signal (current signal) and outputs the converted current signal. The amplifier A2 converts this current signal output from the photo diode D2 to a voltage signal and outputs it. The electric signal output from the amplifier A2 is transmitted to the electro-optical composite receptacle 120 through the lead wire 114, the power line 131, and the power connecting metal 112.

The electric signal transmitted from the electro-optical composite plug 110 is input to the transceiver 123 through the receiver 122 that receives the power connecting metal 112, the power line 141, and the lead wire 124. In the transceiver 123, this received electric signal is input to the amplifier A1. After amplified by the amplifier A1, it is input to the laser driver B. In the laser driver B, a pulse signal (voltage signal) received from the amplifier A1 is converted to a current signal. The laser driver B supplies the converted current signal to the laser diode D1. The laser diode D1 is driven by the current signal generated by the laser driver B and emits beam according to a pattern corresponding to the input signal so as to generate an optical signal. Then, the optical signal generated from the laser diode D1 is transmitted through the optical fiber 142.

Information transmission in an opposite direction, for example, transmission of the optical signal from the optical fiber 142 of the cable 140 is carried out in the same way as the above-described operation.

Figure 5:
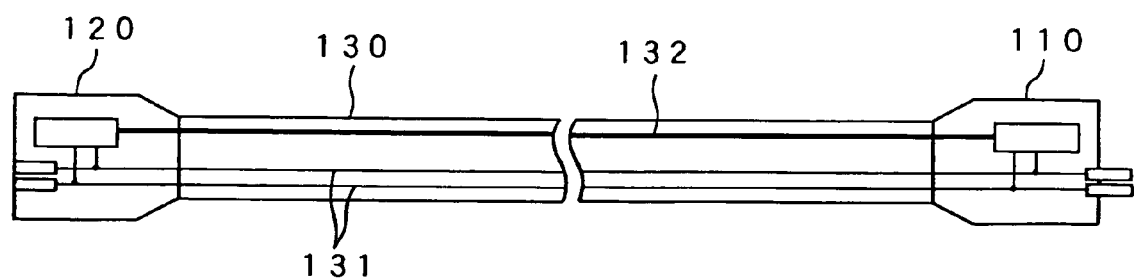
FIG. 5 is a diagram for showing a configuration of an electro-optical composite cable according to a second embodiment of the invention.

FIG. 5 shows a configuration of the electro-optical composite cable 100A according to another embodiment of the invention. As shown in FIG. 5, the electro-optical composite cable 100A comprises an electro-optical composite plug 110, an electro-optical composite receptacle 120 and a cable body 130. The electro-optical composite plug 110 is disposed at an end of the cable body 130. The electro-optical composite receptacle 120 is disposed at the other end of the cable body 130. This electro-optical composite cable 100A can be used as an extension cable.

Figure 6:
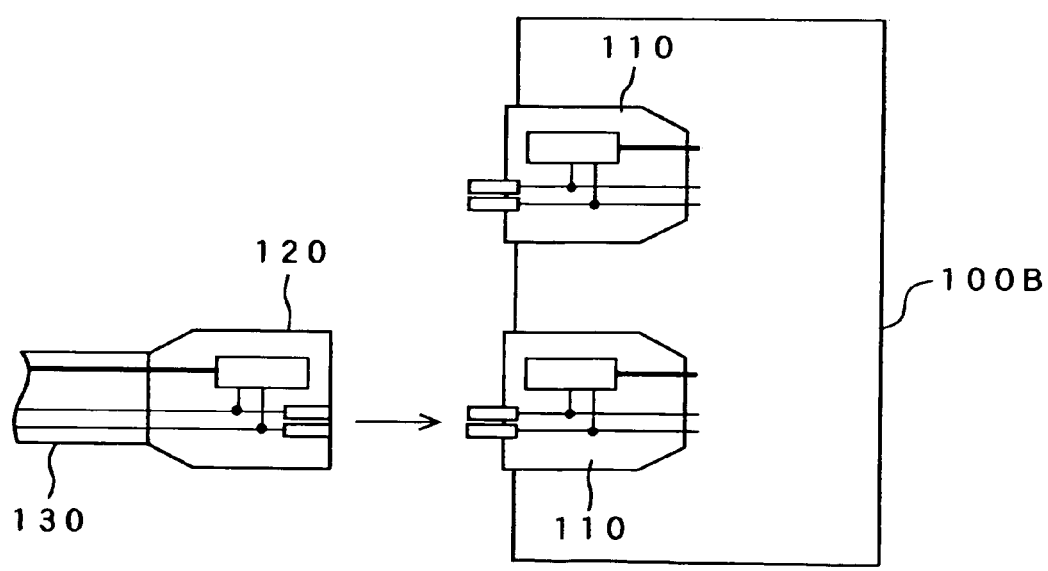
FIG. 6 is a diagram for showing a configuration of a network device according to a third embodiment of the invention.

FIG. 6 shows a configuration of a network device 100B. This network device 100B is a hub, a router or the like for construction of the network.

The network device 100B contains an electro-optical composite plug 110 to which the electro-optical composite receptacle 120 of the electro-optical composite cable 100A can be connected. The network device 100B may contain the electro-optical composite receptacle 120. Connecting a device to another device with the electro-optical composite cable 100A allows complexity in wiring between the devices to be eliminated and deterioration of signal due to dust and dirt on a ferrule-connecting end face to be suppressed.

According to the embodiments, the electro-optical composite plug 110 or the electro-optical composite receptacle 120 converts the optical signal from the optical fiber to the electric signal and transmits it to the opposing electro-optical composite receptacle 120 or electro-optical composite plug 110 through the power connecting metal 112 and the receiver 122. The opposing electro-optical composite receptacle 120 or electro-optical composite plug 110 converts the electric signal to the optical signal and transmits it to the optical fiber. As a result, the optical fiber is not exposed outside, thereby suppressing signal deterioration due to dust or dirt adhering to a ferrule-connecting end face, which has been seen conventionally. Further, no special care is needed for handling the optical fiber, thereby allowing an ordinary user to use the connector or the like easily.

Further, according to the invention, signal deterioration due to flaw in the exposed section of the optical fiber is also prevented. A problem about the safety due to usage of laser can be solved.

Because the electric signal is transmitted using the power connecting metal 112 and the receiver 122, the structure can be simplified and necessary cost can be suppressed. Further, because a portion using the electric signal is very short, deterioration of information and drop in transmission velocity can be minimized.

By providing with the same interface as a conventional outlet, a user can achieve information communication without being conscious of any new matter about handling.

Hereinafter, still another embodiment of the present invention will be described with reference to the accompanying drawings.

Figure 7:
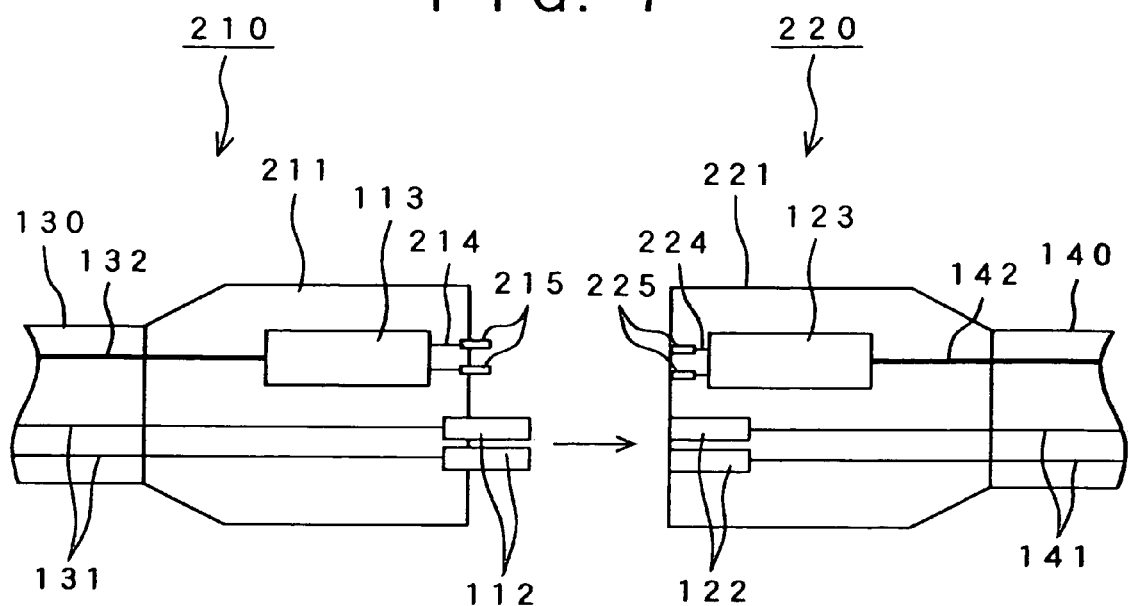
FIG. 7 is a diagram for showing a configuration of an electro-optical composite connector according to a fourth embodiment of the invention.

FIG. 7 shows a configuration of an electro-optical composite connector 200 according to the embodiment. In FIG. 7, like reference numerals are attached to components corresponding to FIG. 3.

As shown in FIG. 7, the electro-optical composite connector 200 comprises an electro-optical composite plug 210 and an electro-optical composite receptacle 220. FIG. 7 shows the condition that a cable 130 is connected to the electro-optical composite plug 210 and a cable 140 is connected to the electro-optical composite receptacle 220.

The electro-optical composite plug 210 comprises a housing 211, a power connecting metal 112, a transceiver 113 serving as signal converting means, a lead wire 214 and a connecting terminal 215.

The housing 211 is formed in substantially the same configuration as that of the housing of the conventional power plug. The power connecting metal 112 and the connecting terminal 215 are disposed at the front end section of this housing 211 and a cable 130 is disposed at the rear section thereof. The transceiver 113 is provided within the housing 211.

In this embodiment, the power connecting metal 112 is constituted of a pair of terminals made of conductive metal, which may be inserted into an outlet. An end of the power connecting metal 112 projects from the housing 211. The other end of the power connecting metal 112 is fixed within the housing 211 and connected to a power line 131 in the cable 130.

The transceiver 113 converts an optical signal transmitted through the optical fiber 132 to an electric signal and converts the electric signal, which has been gained from conversion of the optical signal, to the optical signal. This transceiver 113 is sealed in the housing 211 and connected to an optical fiber 132 in the cable 130. The transceiver 113 is connected to the connecting terminal 215 through the lead wire 214. The electric signal output from the transceiver 113 is transmitted to the opposing electro-optical composite receptacle 220 through the lead wire 214 and the connecting terminal 215. The electric signal from the opposing electro-optical composite receptacle 220 is input to the transceiver 113 through the connecting terminal 215 and the lead wire 214.

In this embodiment, the connecting terminal 215 is composed of male terminals made of a pair of conductive metal. An end of this connecting terminal 215 projects from the housing 211. The other end of the connecting terminal 215 is fixed inside the housing 211 and connected to the transceiver 113 through the lead wire 214.

The electro-optical composite receptacle 220 comprises a housing 221, a receiver 122 for receiving the electro-optical connecting metal 112, a transceiver 123 serving as signal converting means, a lead wire 224 and a connecting terminal 225.

The housing 221 is formed in substantially the same configuration as that of the housing of the conventional power plug. The receiver 122 and the connecting terminal 225 are disposed at the front end section of this housing 221 and a cable 140 is disposed at the rear section thereof. The transceiver 123 is provided inside the housing 221.

In this embodiment, the receiver 122 is composed of terminals made of a pair of conductive metal. The receiver 122 receives and releases the power connecting metals 112. The receiver 122 may be formed as a terminal for outlet. The receiver 122 is fixed at an end of the housing 221 and connected to a power line 141 of the cable 140.

The transceiver 123 converts an optical signal transmitted through the optical fiber 142 to an electric signal and converts the electric signal, which has been gained by conversion from the optical signal, to the optical signal with the same configuration as that of the transceiver 113. This transceiver 123 is sealed in the housing 221 and connected to an optical fiber 142 of the cable 140. The transceiver 123 is connected to the connecting terminal 225 through the lead wire 224. An electric signal output from the transceiver 123 is transmitted to the opposing electro-optical composite plug 210 through the lead wire 224. The electric signal from the opposing electro-optical composite plug 210 is input to the transceiver 123 through the connecting terminal 225 and the lead wire 224.

In this embodiment, the connecting terminal 225 is composed of female terminals made of a pair of conductive metal. The connecting terminal 215 can be detachably attached to the connecting terminal 225. The connecting terminal 225 is disposed at the front end section of the housing 221 and connected to the transceiver 123 through the lead wire 224.

With such the configuration, the electro-optical composite plug 210 or the electro-optical composite receptacle 220 converts the optical signal from the optical fiber to the electric signal and transmits to the opposing electro-optical composite receptacle 220 or the electro-optical composite plug 210. The opposing electro-optical composite receptacle 220 or the electro-optical composite plug 210 converts this electric signal to the optical signal and transmits it.

Upon communication, the operation of the electro-optical composite connector 200 is the same as that of the electro-optical composite connector 100. In this case, the converted electric signal is transmitted through the connecting terminal 215 and the connecting terminal 225.

An electro-optical composite cable is constructed by disposing the above-described electro-optical composite plug 210 and the electro-optical composite receptacle 220 on both ends of the cable incorporating the power line and optical fiber. This electro-optical composite cable can be used as an extension cable.

By providing a network device, for example, a hub, a router or the like for construction of network with the electro-optical composite plug 210 or the electro-optical composite receptacle 220, a network device for allowing the electro-optical composite cable to be connected thereto can be formed. This allows complexity in wiring between devices to be eliminated and deterioration of signal due to dust or dirt adhering to a ferrule-connecting end face to be suppressed.

According to this embodiment, the electro-optical composite plug 210 or the electro-optical composite receptacle 220 converts the optical signal from the optical fiber to the electric signal and transmits it to the opposing electro-optical composite receptacle 220 or electro-optical composite plug 210 through the connecting terminal 215 and the connecting terminal 225. The opposing electro-optical composite receptacle 220 or electro-optical composite plug 210 converts the electric signal to the optical signal and transmits it to the optical fiber. As a result, the optical fiber is not exposed outside, thereby suppressing signal deterioration due to dust or dirt adhering to the ferrule-connecting end face, which has been seen conventionally. Further, no special care is needed for handling the optical fiber, thereby allowing ordinary user to use the connector or the like easily.

Further, signal deterioration due to flaw in the exposed section of the optical fiber can be prevented. A problem about the safety due to usage of laser can be solved.

There is an advantage that providing with the special connecting terminals 15, 25 protects from an influence of noise from the power line. Further, because a portion using the electric signal is very short, deterioration of information and reduction in transmission velocity can be accordingly suppressed.

By providing with the same interface as a conventional power receptacle, a user can achieve information communication without being conscious of any new matter about handling.

Figure 8:
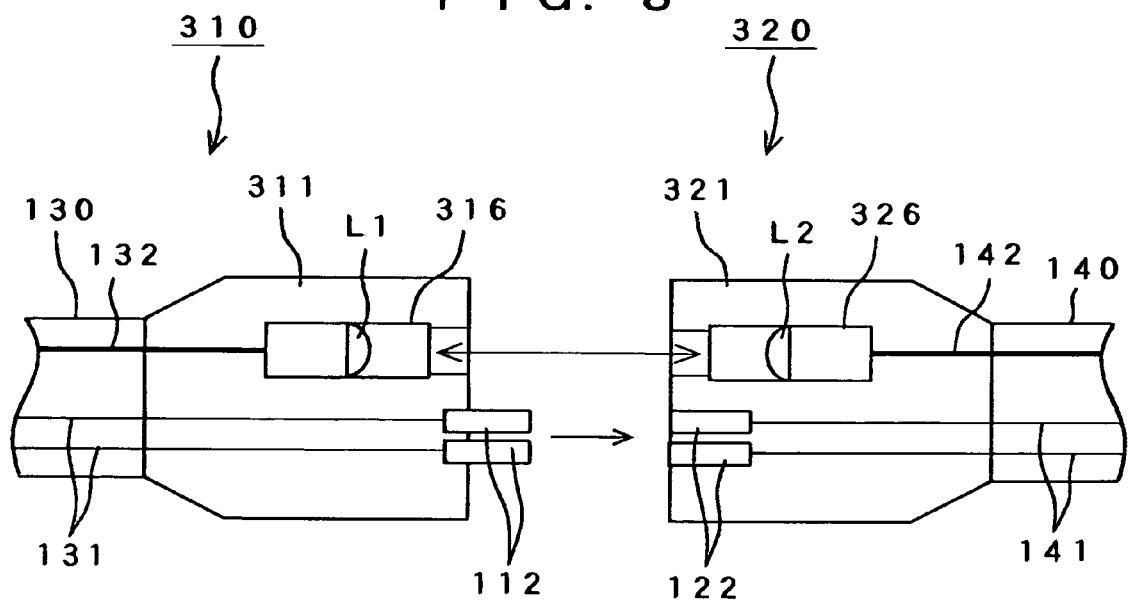
FIG. 8 is a diagram for showing a configuration of an electro-optical composite connector 300 according to a fifth embodiment of the invention.

Hereinafter, a further embodiment of the present invention will be described with reference to the accompanying drawings. FIG. 8 shows a configuration of an electro-optical composite connector 300 according to the embodiment. In FIG. 8, like reference numerals are attached to components corresponding to FIG. 3 and a detailed description is omitted.

As shown in FIG. 8, the electro-optical composite connector 300 comprises an electro-optical composite plug 310 and an electro-optical composite receptacle 320. FIG. 8 shows a condition that a cable 130 is connected to the electro-optical composite plug 310 and a cable 140 is connected to the electro-optical composite receptacle 320.

The electro-optical composite plug 310 comprises a housing 311, a power connecting metal 112, and an optical system 316 serving as signal converting means.

The housing 311 is formed in substantially the same configuration as that of the housing of the conventional power plug. The power connecting metal 112 is disposed at the front end section of this housing 311 and a cable 130 is disposed at the rear section thereof. The optical system 316 is provided inside the housing 311.

The optical system 316 is formed of a lens L1 and the like. The lens L1 is, for example, a collimate lens. The lens L1 shapes an optical signal transmitted through the optical fiber into a form that is easy to transmit it through space, so that transmission through the optical fiber is converted to transmission through space.

The electro-optical composite receptacle 320 comprises the housing 321, a receiver 122 for receiving the power connecting metal 112, and an optical system 326 serving as signal converting means.

The housing 321 is formed in substantially the same configuration as that of the housing of the conventional power plug. The receiver 122 is disposed at the front end section of this housing 321 and a cable 140 is disposed at the rear section thereof. The optical system 326 is provided inside the housing 321.

The optical system 326 is formed of a lens L2 and the like. The lens L2 is, for example, a condensing lens. This lens L2 shapes an optical signal transmitted through space into a form that is easy to receive, so that transmission through space is converted to transmission through the optical fiber.

With this configuration, the electro-optical composite plug 310 changes the optical signal from the optical fiber 132 from transmission through the optical fiber to transmission through space. Further, the electro-optical composite receptacle 320 changes the optical signal from the electro-optical composite plug 310 from transmission through space to transmission through the optical fiber. In the meantime, transmission in the opposite direction can be achieved also.

The operations of the electro-optical composite connector 300 will be described with reference to FIG. 8.

For example, the optical signal transmitted from the optical fiber 132 of the cable 130 is input to the optical system 316. The optical system 316 impinges this input optical signal into the lens L1 and the lens L1 shapes the optical signal transmitted through the optical fiber 132 into a form that is easy to transmit through space. Then, the optical signal is transmitted through space to the electro-optical composite receptacle 320, as an arrow indicated in FIG. 8.

The optical signal transmitted from the electro-optical composite plug 310 is impinged upon the optical system 326 and the optical signal transmitted through space is shaped into a form that is easy to receive by the lens L2, so that transmission through space is converted to transmission through the optical fiber.

Transmission of information in an opposite direction, for example, transmission of the optical signal from the optical fiber 142 of the cable 140 is carried out in the same way as the above-described operation.

An electro-optical composite cable is constructed by disposing the above-described electro-optical composite plug 310 and the electro-optical composite receptacle 320 on both ends of the cable incorporating the power line and optical fiber. This electro-optical composite cable can be used as an extension cable.

By providing a network device, for example, a hub, router or the like for construction of network with the electro-optical composite plug 310 or the electro-optical composite receptacle 320, a network device for allowing the electro-optical composite cable to be connected thereto can be formed. This allows complexity in wiring between devices to be eliminated and deterioration of signal due to dust or dirt adhering to the connecting end face to be suppressed.

According to this embodiment, the electro-optical composite plug 310 or the electro-optical composite receptacle 320 converts the optical signal transmitted through the optical fiber to the optical signal transmitted through space and transmits it to the opposing electro-optical composite receptacle 320 or electro-optical composite plug 310. The opposing electro-optical composite receptacle 320 or the electro-optical composite plug 310 converts the optical signal transmitted through space to the optical signal transmitted through the optical fiber for transmission. As a result, the optical fiber is not exposed outside, thereby suppressing signal deterioration due to dust or dirt adhering to a ferrule-connecting end face, which has been seen conventionally. Further, no special care is needed for handling the optical fiber, thereby allowing ordinary user to use the connector or the like easily.

Further, according to the invention, signal deterioration due to flaw in the exposed section of the optical fiber can be prevented. A problem about the safety due to usage of laser can be solved.

By providing with the same interface as a conventional power receptacle, a user can achieve information communication without being conscious of any new matter about handling.

Although, according to these embodiments, the optical fiber 132, 142 has been described a use of a single optical fiber (one-core bi-directional), the present invention is not restricted to this example. The optical fiber 132, 142 may use two optical fibers (one-core single direction).

The configuration of each of the transceivers 113, 123 is not restricted to the above-described configuration. It is permissible to use an optical communication transceiver containing a waveform shaping circuit.

Although, according to these embodiments, the housings of the electro-optical composite plugs 110, 210, 310 and the electro-optical composite receptacles 120, 220, 320 are formed in substantially the same configuration as that of the housing of the conventional power plug, the present invention is not restricted to these examples. The housing may be formed in other configuration.

Although according to the above-described embodiments, the power connecting metal 112 and the receiver 122 for receiving the power connecting metal 112 are composed of two terminals, the present invention is not restricted to this example, but may be composed of three terminals containing a grounding terminal.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An electro-optical composite connector for connecting first and second cables, said first cable incorporating a first power line and a first optical fiber, and said second cable incorporating a second power line and a second optical fiber, said connector comprising:
an electro-optical composite plug having a power connecting device comprising a conductive material that connects the first power line to supply power, and a first signal converter for converting an optical signal transmitted through the first optical fiber to an electric signal flowing into the conductive material of the power connecting device and for converting an electric signal transmitted through the conductive material of the power connecting device to an optical signal flowing into the first optical fiber; and
an electro-optical composite receptacle having a receiver comprising a conductive material that connects to the second power line for receiving and releasing said conductive material of the power connecting device of the electro-optical composite plug for transmitting power between the first and second power lines, and a second signal converter for converting an optical signal transmitted through the second optical fiber to an electric signal flowing into the conductive material of the receiver and for converting an electric signal transmitted through the conductive material of the receiver to an optical signal flowing into the second optical fiber.

2. The electro-optical composite connector according to claim 1 wherein the first and second signal converters are electrically connected to the first and second power lines; and
wherein, when the electro-optical composite plug and the electro-optical composite receptacle are attached to each other, the electric signal output from any one of the first and second signal converter is transmitted through the power connecting device and the receiver.

3. The electro-optical composite connector according to claim 1 wherein said power connecting device of the electro-optical composite plug includes a pair of male terminals made of conductive material while said receiver of the electro-optical composite receptacle includes a pair of female terminals made of conductive material;
wherein said first and second signal converters are electrically connected to any one of the male terminal and the female terminal; and
wherein, when the electro-optical composite plug and the electro-optical composite receptacle are connected to each other, the electric signal output from any one of the first and second signal converters is transmitted through the male terminal and the female terminal.

4. An electro-optical composite cable comprising:
a cable body incorporating a power line and an optical fiber;
an electro-optical composite plug that is connected to an end of the cable body, said plug having a power connecting device comprising a conductive material that connects said power line to supply power and a first signal converter for converting an optical signal transmitted through the optical fiber to an electric signal flowing into the conductive material of the power connecting device and for converting an electric signal transmitted through the conductive material of the power connecting device to an optical signal flowing into the optical fiber; and
an electro-optical composite receptacle that is connected to the other end of the cable body, said receptacle having a receiver comprising a conductive material that connects to the power line for receiving and releasing a power connecting device, and a second signal converter for converting an optical signal transmitted through the optical fiber to an electric signal flowing into the conductive material of the receiver and for converting an electric signal transmitted through the conductive material of the receiver to an optical signal flowing into the optical fiber.

5. The electro-optical composite cable according to claim 4 wherein the first and second signal converters are electrically connected to the power line; and
wherein the electric signal output from any one of the first and second signal converters is transmitted through the power connecting device and the receiver.

6. The electro-optical composite cable according to claim 4 wherein said power connecting device of the electro-optical composite plug includes a pair of male terminals made of conductive material while said receiver of the electro-optical composite receptacle includes a pair of female terminals made of conductive material;
wherein said first and second signal converters are electrically connected to any one of the male terminal and the female terminal; and
wherein the electric signal output from any one of the first and second signal converters is transmitted through any one of the male terminal and the female terminal.

7. A network device for allowing electro-optical composite cable incorporating a power line and an optical fiber to be connected thereto, said network device comprising any one of an electro-optical composite plug and an electro-optical composite receptacle,
wherein said electro-optical composite plug has a power connecting device comprising a conductive material that electrically connects the power line to supply power, and a first signal converter for converting an optical signal transmitted through the optical fiber to an electric signal flowing into the conductive material of the power connecting device and for converting an electric signal transmitted through the conductive material of the power connecting device to an optical signal; and wherein said electro-optical composite receptacle has a receiver comprising a conductive material electrically connected to the power line for receiving and releasing the conductive material of the power connecting device and a second signal converter for converting an optical signal transmitted through the optical fiber to an electric signal flowing into the conductive material of the receiver and for converting an electric signal transmitted through the conductive material of the receiver to an optical signal.

8. The network device according to claim 7 wherein said first signal converter is electrically connected to the power line; and wherein when the electro-optical composite plug contained in the network device and the electro-optical composite receptacle of the cable are connected to each other, the electric signal output from the first signal converter is transmitted through the power connecting device and the receiver.

9. The network device according to claim 7 wherein said second signal converter is electrically connected to the power line; and wherein when the electro-optical composite plug of the cable and the electro-optical composite receptacle contained in the network device are connected to each other, the electric signal output from the second signal converter is transmitted through the power connecting device and the receiver.

10. The network device according to claim 7 wherein said power connecting device of the electro-optical composite plug includes a pair of male terminals made of conductive material while said receiver of the electro-optical composite receptacle includes a pair of female terminals made of conductive material;

wherein said first signal converter is electrically connected to the male terminal and said second signal converter is electrically connected to the female terminal; and wherein when the electro-optical composite plug contained in the network device and the electro-optical composite receptacle of the cable are connected to each other, the electric signal output from the first signal converter is transmitted through the male terminal and the female terminal.

11. The network device according to claim 7 wherein said power connecting device of the electro-optical composite plug includes a pair of male terminals made of conductive material while said receiver of the electro-optical composite receptacle includes a pair of female terminals made of conductive material;

wherein said first signal converter is electrically connected to the male terminal and said second signal converter is electrically connected to the female terminal; and wherein when the electro-optical composite plug of the cable and the electro-optical composite receptacle contained in the network device are connected to each other, the electric signal output from the second signal converter is transmitted through the male terminal and the female terminal.

12. An electro-optical composite connector for connecting first and second cables, said first cable incorporating a first power line and a first optical fiber, and said second cable incorporating a second power line and a second optical fiber, said connector comprising:

an electro-optical composite plug having a power connecting device that electrically connects the first power line to supply power, and a first signal converter for converting an optical signal transmitted through the first optical fiber to an electrical signal which is transmitted into the first power line and for converting an electrical signal transmitted through the first power line to an optical a signal in the first optical fiber; and an electro-optical composite receptacle having a receiver for receiving and releasing said power connecting device for electrically connecting the first and second power lines, and a second signal converter for converting an optical signal transmitted through the second optical fiber to an electrical signal which is transmitted into the second power line and for converting an electric signal transmitted through the second power line to an optical signal in the second optical fiber.

* * * * *